UNITED STATES PATENT OFFICE.

JOHN FRY, OF JOHNSTOWN, PENNSYLVANIA.

IMPROVEMENT IN AMALGAM FOR FILLING TEETH.

Specification forming part of Letters Patent No. 172,726, dated January 25, 1876; application filed May 17, 1875.

*To all whom it may concern:*

Be it known that I, JOHN FRY, of Johnstown, in the county of Cambria and State of Pennsylvania, have invented certain new and useful Improvements in Amalgams for Filling Teeth; and I do hereby declare the following to be a full, clear, and exact description of the invention, such as will enable others skilled in the art to which it pertains to make and use it.

My invention relates to an improvement in amalgams for filling teeth, composed of the ingredients hereinafter set forth and claimed, which amalgam, not being porous, will not shrink while hardening, but continues to fill the same space in the tooth when solid as when soft or plastic.

In the composition of this amalgam I use the following ingredients in or about the proportions given below: Silver, one ounce; tin, one ounce five and a half pennyweights; zinc, one and a half pennyweight; platinum, ten grains.

To the above, mercury is added in sufficient quantity to form them into a paste.

Having thus described my invention, I claim—

An amalgam composed of silver, tin, zinc, platinum, and quicksilver, (mercury,) in or about the proportions specified.

In testimony that I claim the foregoing I have hereunto set my hand this 13th day of May, 1875.

JOHN FRY.

Witnesses:
 JOHN BRADY,
 J. C. MALOY.